United States Patent [19]

Hatanaka et al.

[11] Patent Number: 5,525,404
[45] Date of Patent: Jun. 11, 1996

[54] TAPE-SHAPED MAGNETIC MEDIUM COMPRISING HEXAGONAL FERRITE PARTICLES HAVING A CRYSTAL STRUCTURE WHICH INCLUDES MAGNETOPLUMBITE AND SPINEL CRYSTAL STRUCTURES

[75] Inventors: Hideo Hatanaka, Neyagawa; Nobuyuki Aoki, Hirakata; Koji Inoue, Kobe, all of Japan

[73] Assignee: Matsushita Electric Industrial Co., Ltd., Osaka, Japan

[21] Appl. No.: 388,503

[22] Filed: Feb. 14, 1995

[30] Foreign Application Priority Data

Feb. 15, 1994 [JP] Japan ................................. 6-018277
Nov. 8, 1994 [JP] Japan ................................. 6-273573

[51] Int. Cl.⁶ .............................. G11B 5/00; G11B 5/62; H01F 1/11
[52] U.S. Cl. ..................... 428/212; 428/213; 428/336; 428/474.4; 428/480; 428/694 BM; 428/694 BH; 428/900
[58] Field of Search ....................... 428/212, 213, 428/336, 474.4, 480, 694 BM, 694 BH, 900

[56] References Cited

U.S. PATENT DOCUMENTS

| | | | |
|---|---|---|---|
| 4,187,341 | 2/1980 | Suzuki et al. ........................... | 428/213 |
| 4,316,927 | 2/1982 | Kimura et al. .......................... | 428/216 |
| 4,561,034 | 12/1985 | Akahane et al. ....................... | 360/134 |
| 4,636,433 | 1/1987 | Kubo et al. ............................. | 428/328 |
| 4,833,019 | 5/1989 | Suwarnasarn ......................... | 428/336 |
| 5,378,547 | 1/1995 | Kubo et al. ....................... | 428/694 BA |
| 5,403,646 | 4/1995 | Saito et al. ............................ | 428/141 |

FOREIGN PATENT DOCUMENTS

| | | |
|---|---|---|
| 56-11624 | 2/1981 | Japan . |
| 56-6525 | 1/1983 | Japan . |
| 59-135632 | 3/1984 | Japan . |
| 60-164925 | 8/1985 | Japan . |
| 62-62424 | 3/1987 | Japan . |
| 62-88136 | 4/1987 | Japan . |
| 62-117137 | 4/1987 | Japan . |
| 63-118116 | 5/1988 | Japan . |
| 2-260228 | 10/1990 | Japan . |

*Primary Examiner*—Stevan A. Resan
*Attorney, Agent, or Firm*—Willian Brinks Hofer Gilson & Lione

[57] ABSTRACT

Tape-shaped magnetic medium has a magnetic layer composed of compound powders of hexagonal and spinel ferrites and is designed so that the magnetic layer and the nonmagnetic base film, that is either a PEN film or an aromatic polyamide film, have specified ratios of their thicknesses and their Young's module for the longitudinal directions as well as for the transverse directions.

6 Claims, 1 Drawing Sheet

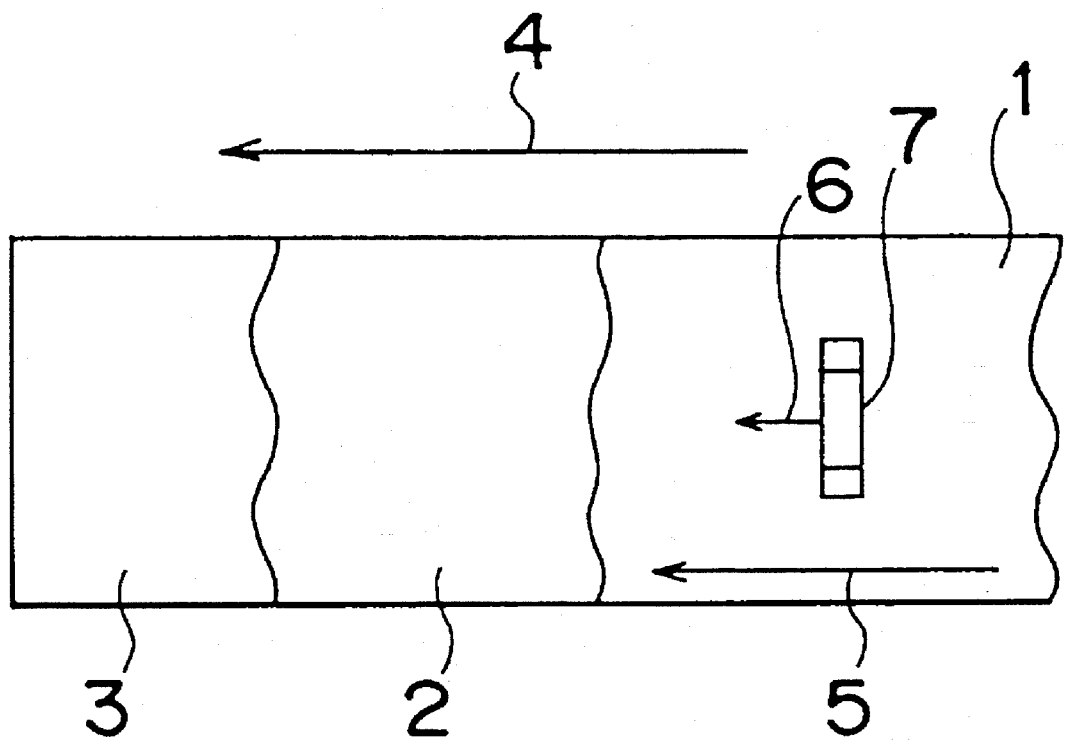

TAPE-SHAPED MAGNETIC MEDIUM COMPRISING HEXAGONAL FERRITE PARTICLES HAVING A CRYSTAL STRUCTURE WHICH INCLUDES MAGNETOPLUMBITE AND SPINEL CRYSTAL STRUCTURES

BACKGROUND OF THE INVENTION

1. Field of the Invention

The present invention generally relates to a high-performance tape-shaped magnetic medium that allows for high-density recording in the sub micron region, and more particularly, relates to a tape-shaped magnetic medium for information recording that can be exchangeable with a data storage magnetic medium in use for digital recording.

2. Description of the Prior Art

Ever increasing capacity of various types of information requires a medium that provides high-density recording and saves space for libraries. For example, various kinds of sequential data from a satellite are stored for a long period of time after they are recorded. In such an example as this, libraries increase every year and securing a space for the storage is considerably expensive. There is also a demand for a compact and high-capacity recording medium for use as a backup of ordinary information data. Currently there are two major rapidly advancing data storage systems that meet these requirements: a digital data storage (DDS) that utilizes a mechanical system of a digital audio tape recorder (DAT) for data recording and a system that employs an 8 mm VTR mechanism.

The current major magnetic recording medium, particularly in use for a DDS and an 8 mm system, is one coated with metal magnetic powder. The metal coated medium has taken advantage of large magnetization and high coercive force that suppresses self-demagnetization and recording-demagnetization for increasing recording density. It has exhibited, however, a problem of large demagnetization during storage for a long period of time at a high temperature and high humidity causing, and in the worst case, a complete loss of recorded data. In order to increase a recording, density metal alloy films having a high saturated magnetic flux density are also used as recording magnetic films for magnetic recording heads. When this kind of magnetic head is used in the double speed data recording mode, the medium is burnt to the head resulting in considerable reduction of output signals. Therefore, aforementioned magnetic recording medium currently used widely satisfies the required electromagnetic conversion characteristics for reading data, but soils the magnetic head by being burnt to it and fails to demonstrate a good environmental storage capability. Recently hexagonal ferrite powder materials such as barium ferrite have attracted an attention for solving these problems. These powder materials are acid resistant, provide a good environmental stability and an excellent short-wavelength recording characteristic, and have an axis of easy magnetization perpendicular to a plane. A tape-shaped magnetic medium having an axis of easy magnetization aligned in the longitudinal direction is under development by using these magnetic materials. (For example, Japanese patent laid-open publication SHO 58-6525 and Japanese patent laid-open publication SHO 60-164925.) In order to increase a capacity of a tape-shaped magnetic medium an attempt to lessen the total thickness of the tape-shaped magnetic medium is being made. This method is known to weaken the mechanical strength of the tape-shaped magnetic medium such as Young's modulus and flexural rigidity, to degrade traveling performance and durability of the magnetic medium, to cause a contact of the tape-shaped magnetic medium with the magnetic head to be unstable, and accordingly to reduce the electromagnetic conversion efficiency. (For example, Japanese patent laid-open publication SHO 56-11624 and Japanese patent laid-open publication SHO 59-135632.) In order to compensate the reduction of the flexural rigidity due to the decrease of the total thickness of the tape-shaped magnetic medium attempts have been made to improve the strength of the nonmagnetic base film which is a major part in volume of the tape-like magnetic material, because the flexural rigidity is proportional to the cube of the thickness of the tape-shaped magnetic medium and also the Young's modulus. Those attempts include a replacement of a polyethylene terephthalate film (referred to as PET) commonly used for AV related products with a polyethylene naphthalate film (referred to as PEN) having higher Young's modulus (for example Japanese patent laid-open publication SHO 62-88136 and Japanese patent laid-open publication SHO 62-117137) and use of aromatic polyamide films (Japanese patent laid-open publication SHO 56-11624 and Japanese patent laid-open publication SHO 62-62424). Other attempts include laminating a base film with a metal film and mixing the magnetic powder with particles of an anisotropic shape which are aligned along the longitudinal direction of the tape-like medium. (Japanese patent laid-open publication SHO 63-118116 and Japanese patent laid-open publication HEI 2-260228). Most of them except for the PEN films are costly to implement them and they are unlikely to be used for commercial products. The flexural rigidity of the tape-shaped magnetic medium depends not only on the total thickness of the tape-shaped magnetic medium but considerably on the shapes of the magnetic powder particles and their alignment in the medium. That is, if acicular magnetic powder particles are aligned along the longitudinal direction of the tape-shaped magnetic medium, the Young's modulus increases in the same direction. In contrast, the Young's modulus for the direction perpendicular to the alignment, the transverse direction in the above example, tends to decrease. This phenomenon exhibits itself more profoundly for a larger profile ratio of the acicular magnetic powder particles (the major axis divided by the minor axis). Therefore, generally, magnetic tapes comprising acicular magnetic powder coated on a nonmagnetic base film such as PET and PEN are designed so that the magnetic layer has larger Young's modulus than that of the nonmagnetic base film in the longitudinal direction of the tape-shaped magnetic medium.

In a case where the magnetic powder particles are ferromagnetic hexagonal ferrite which has an axis of easy magnetization perpendicular to a plane, the Young's modulus in the longitudinal direction of the medium tends to decrease as the magnetic particles are aligned in the longitudinal direction of the tape-shaped magnetic medium. This decrease is enhanced with an increasing aspect ratio (particle diameter divided by particle thickness). Thus, the tape-shaped magnetic medium comprising ferromagnetic hexagonal ferrite powder particles which are aligned in the longitudinal direction of the tape-shaped magnetic medium can be produced with an excellent short-wavelength recording characteristic and guaranteed stability for long storage. However, this design principle causes difficulties in reducing the total thickness of the tape-shaped magnetic medium which is needed for increasing the capacity of the medium: reduction of the flexural rigidity in the longitudinal direction of the tape-shaped magnetic medium resulted from reduction of the Young's modulus in the longitudinal direction of the magnetic layer and the resultant reductions of the durability of traveling of the tape-shaped magnetic medium and the electromagnetic conversion characteristics. Those problems have been difficult to solve.

Thus, for a tape-shaped magnetic medium comprising a nonmagnetic base film and a magnetic layer coated on it and made of ferromagnetic hexagonal ferrite powder particles which have an axis of easy magnetization perpendicular to the plane, the conventional design of aligning acicular magnetic powder in the longitudinal direction of the medium for reducing the medium thickness does not provide either sufficient durability for traveling nor electromagnetic properties.

SUMMARY OF THE INVENTION

Reducing the total thickness of a tape-shaped magnetic medium causes the flexural rigidity of the medium to decrease and accordingly the durability for traveling and the electromagnetic conversion characteristics to reduce. The object of the present invention, therefore, is to provide a tape-shaped magnetic medium that exhibits good durability for traveling and electromagnetic conversion characteristics even when the total thickness of the tape-shaped magnetic medium is reduced. In the present invention the tape-shaped magnetic medium includes on either side of a nonmagnetic base film one or two magnetic layers (one layer on top of the other) comprising ferromagnetic powder particles of which magnetization is aligned in the longitudinal direction of the tape-shaped magnetic medium. The ferromagnetic powder particles in the magnetic layers are plate-like ferromagnetic hexagonal ferrite powder particles that have an axis of easy magnetization perpendicular to the plate. The nonmagnetic base film is a polyethylenenaphthalate film, the ratio of its thickness to that of the magnetic layer being between 1.7 and 4.0. The ratio of the Young's modulus of the polyethylenenaphthalate film and that of the magnetic layer is between 0.8 and 1.2 in the longitudinal direction of the tape and between 0.5 and 0.8 in the transverse direction.

The tape-shaped magnetic medium of the present invention may include on either side of a nonmagnetic base film at least one or two magnetic layers (one layer on top of the other) comprising ferromagnetic powder particles of which magnetization is aligned in the longitudinal direction of the tape-shaped magnetic medium. The ferromagnetic powder particles in the magnetic layers are plate-like ferromagnetic hexagonal ferrite powder particles that have an easy axis of magnetization perpendicular to the plate. The nonmagnetic base film is an aromatic polyamide film, the ratio of its thickness to that of the magnetic layer being between 2.0 and 3.5. The ratio of the Young's modulus of the aromatic polyamide film and that of the magnetic layer is between 1.0 and 3.0 in the longitudinal direction of the tape and between 0.5 and 1.5 in the transverse direction.

The recording medium having the aforementioned configuration provide a recording density equal to the conventional metal coated medium, improve the environmental storage capability that has been a problem to solve, reduce the medium burning to a head, and allow for a thinner tape-shaped magnetic medium that is suitable to store extremely large capacity of data. The magnetic medium of the present invention was obtained by optimizing the properties of each constituent medium. That is, an improvement of output signal intensity in high density recording was achieved by using the effect of sharp reverse of magnetization in the transition region of the plate-like ferromagnetic hexagonal ferrite powder particles, especially the barium substituted ferrite. The basic layered oxide crystal structure steadily provides a good environmental stability. The unique shape of the plate-like ferromagnetic hexagonal ferrite powder particles gives rise to a larger squareness ratio in comparison with the conventional tape-shaped magnetic medium as well as a bottom Young's modulus in the longitudinal direction of the tape-shaped magnetic medium. This reduction of the Young's modulus is compensated by using a polyethylenenaphthalate film as a nonmagnetic base film. The ratio of its thickness to that of the magnetic layer is designed to be between 1.7 and 4.0 with the ratio of the Young's module of the base film and that of the magnetic layer being between 0.8 and 1.2 in the longitudinal direction of the tape and between 0.5 and 0.8 in the transverse direction. The same effect is also obtained by using an aromatic polyamide film as a nonmagnetic base film. The ratio of its thickness to that of the magnetic layer this time is between 2.0 and 3.5 and the ratio of the Young's modulus of the aromatic polyamide film and that of the magnetic layer is between 1.0 and 3.0 in the longitudinal direction of the tape and between 0.5 and 1.5 in the transverse direction. These configurations produce a good balance of flexural rigidities of the whole tape-shaped magnetic medium between the lengthwise and transverse directions and accordingly a strong durability for traveling and a good electromagnetic properties for a thin tape-shaped magnetic medium adapted to high capacity data storage.

The total thickness of the tape-shaped magnetic medium according to the present invention is desirably larger than 7 μm and smaller than 10 μm in the case of a PEN base film. The ratio of the thickness of the base film to that of the magnetic layer should be between 1.7 and 4.0 in the case of a PEN base film. If the ratio of the thickness is smaller than 1.7, it becomes difficult to maintain the Young's modulus in the longitudinal direction of the tape-shaped magnetic medium. If it becomes larger than 4.0 the durability against repetive use is worsened because it becomes impossible to maintain a good balance of flexual rigidities between the base film and magnetic layer. By setting the ratio of the thickness and that of the Young's modulus in the above mentioned ranges, respectively, resistivities against flexure, tensile stress and the like are supposed to be well balanced between the longitudinal direction and the transverse direction of the tape-shaped magnetic medium.

A conventional base film is applicable for the tape-shaped magnetic medium having a total thickness larger than 10 μm. On the other hand, as to the tape-shaped magnetic medium having a total thickness less than 7 μm, aromatic polyamide film is desirably used for the base film and the total thickness thereof is desirably between 4 μm and 7 μm. In this case, it is necessary for enhancing the durability against repetitive use, because of the same reasons as mentioned above to balance resistivities against flexure, tencil stress and the like between the longitudinal direction and the transverse direction of the whole tape-shaped magnetic medium. By setting the ratio of thickness of the base film to the magnetic layer between 2.0 and 3.5 and the ratios of Young's modulus thereof in the lengthwise and transverse directions between 1.0 and 3.0 and between 0.5 and 1.5, the weakness in the Young's modulus of the magnetic layer especially in the longitudinal direction can be suppressed and the balance between rigidities in the lengthwise and transverse directions of the medium can be well maintained as a whole. These configurations can guarantee a superior durability for repetitive use.

Thus, according to the present invention, it becomes possible to realize mechanical properties comparable with those of the conventional tape-shaped magnetic medium comprising acicular magnetic powder by baring the whole Young's modulus of the tape-shaped magnetic medium with the base film and the magnetic layer comprising plate-like ferromagnetic hexagonal ferrite powder having a special structure and composition.

Thus, according to the present invention optimization of the magnetic powder particles and the configuration of the medium provides a magnetic medium having a good environmental resistance and produces well-balanced, high-level output. Therefore, the present invention demonstrates a magnetic medium that is not only replaceable with the conventional magnetic medium but also useful for the future digital recording.

BRIEF DESCRIPTION OF THE DRAWINGS

FIG. 1 shows a partial plan view of the tape-shaped magnetic medium of one embodiment according to the present invention for showing each of layers forming the tape-shaped magnetic medium.

DETAILED DESCRIPTION OF THE PREFERRED EMBODIMENTS

An embodiment of the tape-shaped magnetic medium according to the present invention is described with reference to FIG. 1. In the figure reference numeral 1 denotes a magnetic layer, 2 a nonmagnetic base film, 3 a back coat layer, 4 the longitudinal direction of the magnetic tape, 5 an axis of easy magnetization of the magnetic layer, 6 an axis of easy magnetization of a plate-like ferromagnetic hexagonal ferrite powder particle, 7 a ferromagnetic hexagonal ferrite powder particle. The magnetic tape according to the present invention comprises a nonmagnetic base film and a magnetic layer including plate-like ferromagnetic hexagonal ferrite powder particles and the ratio of Young's modulus of those layers is designed to have a special value so that the magnetic tape can provide a good balance on the electromagnetic properties, the practical durability, and the mechanical characteristics.

The magnetic paint that is applied on the nonmagnetic base film was prepared with the following components:

| | |
|---|---|
| plate-like ferromagnetic hexagonal ferrite powder particles | 100 weight % |
| copolymerized resin of vinyl chloride | 9 weight % |
| polyurethane resin | 7 weight % |
| α-alumina | 5 weight % |
| stearic acid | 3 weight % |
| butyl stearate | 1 weight % |
| carbon black | 3 weight % |
| methyl ethyl keton | 81 weight % |
| toluene | 81 weight % |
| cyclohexanone | 50 weight % |

The above materials were mixed and then dispersed for a fixed time with a kneader, mixer, and sand mill. The plate-like ferromagnetic hexagonal ferrite powder particles used above have a particle diameter of 0.05 μm, an aspect ratio of 4, and a coercive force of 80 kA/m. Those values were obtained by partly substituting barium, iron, nickel, titanium, lead etc. in the plate-like ferromagnetic hexagonal ferrite powder particles. These magnetic powder particles were produced from the constituent materials which were formed in hexagonal flake with the autoclaving or copre- cipitation method and then underwent the aqueous solution synthesis below 100° C. Afterward it may be sintered if it is needed. One may use other methods if those methods produce a crystallographically sufficiently stable mixture of the magnetoplumbite structure and spinel ferrite structure. Next, a hardener corresponding to 30% of the resin binder was added while stirring to the dispersed and diluted magnetic paint with an appropriate amount of solvent; then the paint was applied with a die type nozzle coater at a speed of approximately 100 m/min. The tape was passed between two permanent magnets which were arranged in such a way that the same magnetic poles were facing with each other: then it was passed a solenoid magnet alignment device which has the same magnetic poles facing each other in order to align the complex ferromagnetic powder particles in the longitudinal direction of the film. After the applied layer was dried and hardened, a back coat of 0.7 μm in thickness was applied to the side which is opposite to the side where the magnetic layer was applied. This is the completion of the magnetic medium of the Embodiment 1. One may preferably control the medium to have an appropriate surface roughness by the surface smoothing process after the applied magnetic layer is dried in the present invention. In a case where the smoothing process is done by the calendaring method, the super calendaring method is preferably used, in which case a film passes through between two rolls, a metal roll and a nylon or cotton roll. As a nonmagnetic base film used was a PEN (polyethylene naphthalate) film of 5.8 μm in thickness.

The thickness of the base film is not limited as long as the total thickness of the magnetic tape falls within a predetermined range and the ratio of the thickness of the base film to the thickness of the magnetic layer takes a satisfactory value as defined in attached claims.

Although an adhesive layer was not formed in this embodiment, polyester resin of less than 0.1 μm in thickness when dried can be applied for better adhesion between the base film and magnetic layer, if necessary. In Embodiment 1, the magnetic layer was 2.4 μm in thickness. There is no restriction on the thickness and it may be different depending on the recording length. It is, however, preferable to be between 1.3 and 3.1 in practice. The squareness ratio (residual magnetization/saturation magnetization) in the longitudinal direction of the magnetic layer of the magnetic tape of the present invention is preferred to be larger than 0.65, more preferably 0.70. If the squareness ratio is less than 0.65, the residual magnetization is small unless maintaining a sufficient packing ratio and gives rise to a bottom output characteristic. The coercive force of the magnetic tape of the present invention is preferably between 60 kA/m and 120 kA/m. More particularly, the coercive force of the magnetic layer of the magnetic tape of claim 1 according to the present invention is preferably between 70 kA/m and 95 kA/m. If said coercive force is less than 70 kA/m, it does not produce a strong enough output in short wavelengths, while if it is over 95 kA/m, the magnetic tape does not provide a strong enough output in long wavelengths. The magnetic layer may include multiple layers. In that case it is preferable to have the coercive force of the magnetic layer incline toward the inward direction of the medium. In the present embodiment the bottom layer is designed to have a smaller coercive force in order to attain a linearity of the frequency response and to improve the recording sensitivity. Since a low coercive force allows for sufficiently good quality of recording when the axis of easy magnetization of the top layer is parallel to the direction along the film thickness, the configuration of the top layer thickness and the coercive forces of both layers may control. Further, in the case where the magnetic layer consists of two layers, the coercive force of the ferromagnetic powder in the top layer is set to be larger than that of the bottom layer. More particularly, with the coercive force of the top layer being 1.3–1.8 times as large as that of the bottom layer, the net coercive force of the combined layers is made to be between 60 kA/m and 120 kA/m, which improve the output characteristics from a long wavelength to short wavelength. More preferably, the coercive force of the top layer is between 90 kA/m and 120 kA/m and that of the bottom layer is 60 kA/m and 80 kA/m. In this case, if the coercive force of the magnetic powder in the top layer is smaller than 1.3 times as much as that of the bottom layer, poor output improvement is achieved over the wide range of the wavelengths, and a coercive force in the top layer larger than 1.8 times as much as that of the bottom layer enhances the frequency dependence of the output and gives rise to low output intensity at special wavelengths. The back coat layer was formed on the side of the base tape opposite to the side where the magnetic layer was formed in order to control electrified charges and to obtain the traveling stability of the tape. It includes the following components: carbon black of the average primary particle size of 20 μm, 100 weight %; α-$Al_2O_3$ doped with coverlet, 3 weight %; polyurethane resin, 45 weight %; nitrocellulose resin, 45 weight %; mixed organic solvent (MEK/toluene/cyclohexanone=2/2/1), 600 weight %. The above components were mixed and dispersed in a ball mill, and then were circulated through a filter having an average pore diameter of 1 μm. Finally, a compound of polyisocyanate, 10 weight % (Colonate L from Nippon Polyurethane) was added to it and mixed to make a paint for back coating. The thickness of the back coat layer falls within a range such that the curling nature of the magnetic layer is not worsened and preferably a range between 0.5 and 1.0 μm. In this embodiment a description is made with reference to an exchangeable alternative tape with the DDS tape medium. Thus, sample tapes for the embodiments and comparisons to be described below were cut to be 3.79–3.81 mm wide for evaluation measurement.

The plate-like ferromagnetic hexagonal ferrite magnetic powder particles used in the present invention have a flake profile ratio between 2 and 6, the particle diameter of less than 0.1 μm, preferably, between 0.02 and 0.06 μm. If the profile ratio of the magnetic powder particle is less than 2, sufficient alignment is difficult to obtain. If it is over 6, the plate-like magnetic powder particles have more tendency to aggregate with one flake on top of the other, resulting in increase of noise and reduction of the Young's modulus in the longitudinal direction of the tape which gives rise to a poor traveling durability. If the particle diameter of the magnetic powder is less than 0.02 μm, the magnetization of the magnetic powder becomes less and dispersion in the paint becomes difficult, resulting in poor output signals because sufficiently high packing density cannot be achieved. If the particle diameter is over 0.1 μm, the magnetic powder looses the features as fine powder in comparison with acicular magnetic powder, and the smoothness of the tape surface also becomes difficult to obtain. The plate-like ferromagnetic hexagonal ferrite powder used in the present invention is required to have a large magnetization and an excellent temperature characteristic as well as a good remanence characteristic and needs to include in it both the magnetoplumbite and spinel structures at the same time to fulfill those requirement. More particularly, it is desirable for the magnetic powder to include nickel, titanium, lead, as well as barium and iron as main constituent elements. The magnetic powder, however, is not limited to this composition. There is no special restriction on the magnetic flux density. If it is lower than 0.16 T, however, the necessary output signal intensity cannot be obtained, and if it is larger than 0.25 T, the packing density of the magnetic powder particles becomes so large that the particles interact considerably strongly resulting in increase of noise and loss of the surface properties of the medium. Thus, the magnetic flux density is desirable to lie between the above two values. The PEN film used as a nonmagnetic base film in the present invention is composed of a copolymer which has a repetition unit essentially composed of ethylene-2,6-naphthalenedicarboxylate less than 10%, desirably less than 5%, of which is replaced with other components, and a mixture of the above coplymer and other kinds of polymers. The desirable PEN film has been stretched in the lengthwise as well as transverse directions and subjected to reinforcement. The sum of the Young's modulus in the lengthwise and transverse directions of the PEN film can be made 1.2–1.6 times as large as the sum of the Young's module in the both directions of a similarly reinforced PET film. The aromatic polyamide nonmagnetic base film has a structure in which aromatic rings such as benzene rings are bonded with amide bonding, and more than 70% of the amide bonding is made of at least one of the chemical bondings due to terephthalhydrazide, parabenzamide, and paraphenyleneterephthalamide. The desirable structure is made of the bonding of paraphenyleneterephthalamide. The binding resins used in the present invention are thermoplastic resins such as a polyvinyl chloride resin, a polyurethane resin, a polyester resin, a cellulose resin, an acrylic resin, and a rubber resin; desirably a mixture of the aforementioned thermoplastic resin containing one or more of hydrophilic radicals such as a hydroxyl group, sulfonic acid metal base, a sulfobetaine base, and a carboxyl with a polyisocyanate compound; and resins having radiation sensitive unsaturated double bonds. Those resins have been widely known. The total thickness of the tape is desirably between 7 μm and 10 μm for a PEN film. A magnetic medium thicker than 10 μm may be replaced with a conventional base film without a problem. For a magnetic medium thinner than 7 μm, an aromatic polyamide film may be used between 4.0 and 7.0 μm in total thickness.

Embodiment 2

The sample of the magnetic tape for Embodiment 2 is the same as that of Embodiment 1 except that the thicknesses of the magnetic layer and the back coat are 2.4 μm and 0.7 μm, respectively, and that a PEN base film stretched and reinforced in the longitudinal direction is used as a nonmagnetic base film.

Embodiment 3

The sample of the magnetic tape for Embodiment 3 is the same as that of Embodiment 1 except that the thicknesses of the magnetic layer and the back coat are 2.4 μm and 0.7 μm, respectively and that a PEN base film stretched and reinforced (reinforced to a different strength from Embodiment 2) in the longitudinal direction is used as a nonmagnetic base film.

Embodiments 4–12

In these embodiments the same components used for Embodiment 1 were well mixed and dispersed, and then applied to each of the base films of which thicknesses and Young's modulus are listed in Table 1. The thicknesses of the applied layers after being dried are also shown in Table 1. Embodiments 8–12 employ two magnetic layers which are composed of the same ferromagnetic powder and have the same structure as Embodiment 1. However, the coercive forces of the two layers were made different: the coercive force of the ferromagnetic powder of the top magnetic layer has 95 kA/m and that of the bottom layer has 79 kA/m.

Comparison 1

DDS substandard tape (RSD-1079) was used for comparison.

Comparison 2

The components of the magnetic layer are the same as Embodiment 1 except that a metal ferromagnetic powder including cobalt and nickel (the acicular profile ratio of is 10 and the coercive force is 123 kA/m) is used for a magnetic layer. The mixture and dispersion were done with a kneader and grinding mill in the same way as Embodiment 1. After the paint was made, appropriate amounts of lubricant and hardener were added to it while being stirred. The magnetic paint was then applied to the base film using a die type nozzle coater at a speed of approximately 100 m/min to obtain a thickness of 2.4 μm. After the magnetization was aligned along the longitudinal direction and in the film surface, the tape was completely dried and the back coat of 0.7 μm in thickness was applied to it. Finally the tape was cut into a desired width to be a sample magnetic tape of Comparison 2.

Comparison 3

The magnetic layer is the same as that used for Embodiment 1. The mixture and dispersion were done with a kneader and pin type sandmill in the same way as Embodiment 1. After the paint was made, appropriate amounts of lubricant and hardener were added to it while being stirred. The magnetic paint was then applied to the base film using a die type nozzle coater at a speed of approximately 100 m/min to obtain a thickness of 2.4 μm. In this case the magnetization was not aligned. The tape was completely dried and the back coat of 0.7 μm in thickness was applied to it to make a sample magnetic tape for Comparison 3. The nonmagnetic base film used for Comparison 3 was the same as the one used for Comparison 2.

Comparison 4

The sample magnetic tape for Comparison 4 was prepared following the same way as Embodiment 1 except that the nonmagnetic base film was a PEN film that was stretched and reinforced in the transverse direction.

Comparison 5

The sample magnetic tape for Comparison 5 was prepared following the same way as Embodiment 1 except that the nonmagnetic base film was a PEN film that was stretched and reinforced in the transverse direction (The strength of the stretching was different from Comparison 4).

Comparison 6

The sample magnetic tape for Comparison 6 was prepared following the same way as Embodiment 2 except that the magnetic powder is the plate-like ferromagnetic hexagonal ferrite used for Embodiment 1 but has the magnetoplumbite crystal structure and a coercive force of 59.0 kA/m.

Comparison 7

The sample magnetic tape for Comparison 7 was prepared in the same way as Embodiment 1 except that the flake profile ratio of the magnetic powder is 8 instead of 4.

Comparison 8

The sample magnetic tape for Comparison 8 was prepared in the same way as Embodiment 3 except that the magnetic powder was the plate-like ferromagnetic hexagonal ferrite powder used for Embodiment 1 that has an average particle diameter of 0.14 μm.

Comparison 9

The sample magnetic tape for Comparison 9 was prepared in the same way as Embodiment 1 except that the magnetic layer and back coat layer were the same as Embodiment 8 and the thicknesses of both the layers are 1.5 μm and 0.5 μm respectively.

Comparison 10

The sample magnetic tape for Comparison 10 was prepared in the same way as Embodiment 5 except that the base film is the same as used for Embodiment 1 but has 5.0 μm in thickness.

Comparison 11

The sample magnetic tape for Comparison 11 was prepared with the base film used for Embodiment 8 on which the bottom and top layers, 1.5 μm and 0.2 μm thick, respectively, were applied simultaneously with a double nozzle coater.

Comparison 12

The sample magnetic tape for Comparison 12 was prepared with the base film used for Embodiment 12 on which the bottom and top layers, 2.7 μm and 0.2 μm thick, respectively, were applied simultaneously with a double nozzle coater.

Comparison 13

The sample magnetic tape for Comparison 13 has two magnetic layers (top and bottom) and was prepared in the same way as Embodiment 11 except that the base film is the PEN used for Comparison 4.

Comparison 14

The sample magnetic tape for Comparison 14 has two magnetic layers (top and bottom) and was prepared in the same way as Embodiment 11 except that the magnetic powder used here is ferromagnetic barium ferrite powder which is a solid solution of the plate-like ferromagnetic hexagonal ferrite powder used for Embodiment 11 and its partial substitution of iron for cobalt, tin, and niobium. The magnetic powder used has the magneto plumbite crystal structure and the same magnetic characteristics and particle diameter.

Comparison 15

The sample magnetic tape for Comparison 15 has two magnetic layers (top and bottom) and was prepared in the same way as Embodiment 10 except that the base film is the PEN used for Embodiment 5 and that the top magnetic layer uses the magnetic powder of the bottom layer in Embodiment 10, and vice versa. The magnetic powder used has the same magnetic characteristics and particle diameter as Embodiment 10.

Embodiment 13

The sample magnetic tape for Embodiment 13 was prepared following the same way as Embodiment 4 except that the nonmagnetic base film was an aromatic polyamide film that was stretched and reinforced in both the lengthwise and transverse directions.

Embodiment 14

The sample magnetic tape for Embodiment 14 was prepared following the same way as Embodiment 4 except that the nonmagnetic base film is the same one as Embodiment 13 but subjected to different stretching from Embodiment 13 in both the lengthwise and transverse directions.

Embodiment 15

The sample magnetic tape for Embodiment 15 has two magnetic layers (top and bottom) and was prepared in the same way as Embodiment 11 except that the base film is the aromatic polyamide film that was used for Embodiment 13.

Embodiment 16

The sample magnetic tape for Embodiment 16 has two magnetic layers (top and bottom) and was prepared in the same way as Embodiment 11 except that the base film is the aromatic polyamide film that was used for Embodiment 15 but subjected to different stretching from Embodiment 15 in both the lengthwise and transverse directions.

Embodiment 17

The sample magnetic tape for Embodiment 17 was prepared in the same way as Embodiment 4 except that the nonmagnetic base film is the same one as Embodiment 13 with the same stretching and reinforcement but is 3.8 µm in thickness.

Embodiment 18

The sample magnetic tape for Embodiment 18 was prepared in the same way as Embodiment 9 except that the nonmagnetic base film used is an aromatic polyamide film with the same stretching and reinforcement as Embodiment 16 but is 2.8 µm in thickness.

Embodiment 19

The sample magnetic tape for Embodiment 19 was prepared in the same way as Embodiment 18 except that the nonmagnetic base film used is an aromatic polyamide film with the same stretching and reinforcement as Embodiment 13 but is 4.4 µm in thickness.

Comparison 16

The sample magnetic tape for Comparison 16 was prepared in the same way as Embodiment 1 except that the nonmagnetic base film used is an aromatic polyamide film stretched and reinforced in the transverse direction.

The thicknesses of the nonmagnetic base films of Embodiments 13–16 and Comparisons 16, 18, and 19 are all 4.2 µm.

Comparison 17

The sample magnetic tape for Comparison 17 has two magnetic layers (top and bottom) and was prepared in the same way as Embodiment 11 except that the base film is the aromatic polyamide film used for Comparison 16 but subjected to further stretching and reinforcement in the transverse direction.

Comparison 18

The paint was formed following Embodiment 13. The thicknesses of the magnetic layer and back coat layer were varied by adjusting the amount of the solid materials. Further, alignment of the magnetization with an external magnetic field was not performed after applying the paint.

Comparison 19

The sample magnetic tape for Comparison 19 was prepared in the same way as Embodiment 16 except that alignment of the magnetization with an external magnetic field was not performed after applying the paint.

The thicknesses of the nonmagnetic base films of Embodiments 13–16 and Comparisons 16, 18, and 19 are all 4.2 µm.

Comparison 20

The sample magnetic tape for Comparison 20 was prepared by applying the magnetic paint used for Comparison 2 on the aromatic polyamide film used for Embodiment 13.

The sample magnetic tapes were evaluated for electromagnetic properties using a DDS drive (Matsushita Electric Co. Model LK-MD2) modified for tape evaluation. The standard signals were recorded on the tapes at a tape/head relative speed of 3.1 m/sec using a MIG type head having a Sendust thin film for recording, a gap length of 0.22 µm, and a track width of 14 µm. The electromagnetic properties were evaluated by measuring the RF output level at 130 kHz, 1.2 MHz, and 4.7 MHz. The environmental stability was evaluated by first storing the tapes under the condition of 50° C. and 90% relative humidity for a week and then measuring a change in magnetic characteristics after the exposure to that environment. For durability evaluation the 10 µm part of the tape was passed through the DDS mechanical deck placed at the standard temperature and relative humidity (23° C. and 60% RH) repetitively 5000 times. The average number of dropouts per minute after the test runs was compared with that before the test run using the 15 µsec and −6 dB range. The block error rate of the whole tape was also measured for the durability evaluation. The Young's modulus of the magnetic layer in the longitudinal direction of the tape was computed from the measured Young's module in the same direction for the nonmagnetic base films with and without the magnetic layer. The measurement of the Young's modulus was performed with the tension test method. The Young's modulus of the magnetic tape in the transverse direction was measured using a strip cut to 3.79–3.81 mm in width along the transverse direction before the tape was cut into actual tapes. The Young's modulus of the magnetic layer in the transverse direction was obtained in the same way as that in the longitudinal direction. The measured results are shown in Tables 1 and 2. The RF outputs are shown relative to the outputs for Comparison 1, of which value was set to be 0 dB.

In Table 1 the E Base and E Mag indicate the tensile Young's modulus of the nonmagnetic base film and the magnetic layer, respectively. The SQ represents the squareness ratio of the tape in the longitudinal direction measured with VSM (vibrating sample magnetometer). The MD and TD mean the lengthwise and transverse directions, respectively. The thicknesses of the two magnetic layers for Embodiments 10–12 and Comparison 11–15 are shown in (top layer)/(bottom layer).

For the output variation measurement a DDS cassette loaded with the magnetic tape was inserted in a DDS drive (Matsushita Electric Co. Model LK-MD2) and the standard signals were recorded and then retrieved at the standard temperature and relative humidity. Table 3 shows the measured RF output levels and block error rates (B.E.R) of the magnetic tapes. Afterward the drive and cassette were placed in the environment of 40° C. and 80% relative humidity for 24 hours and then the change in the output levels and the relative increase of the error rates were measured after the signals had been retrieved and the tape had been rewound over the whole tape length repetitively 5000 times. If the output change is less than 2 dB, it is considered good (O), and if it is more than 2 dB, it is considered poor (X).

From the aforementioned embodiments the magnetic medium configured as shown in the present invention provides a magnetic tape which produces high outputs and exhibits excellent environmental resistance and environmental stability. As a result, advantages from the magnetic tapes having the configuration disclosed in the present invention are apparent as shown in Tables 1, 2, and 3. While the embodiments of the present invention have been described with reference to the tapes 3.8 mm wide which are exchangeable with the DDS tape, it should be understood that they have been presented by way of example only, and not limitation. The magnetic tapes according to the present invention are able to be used as information recording medium for other systems.

TABLE 1

| | Tbase (μm) | Tmag (μm) | Tback (μm) | Ttotal (μm) | Tbase/Tmag (—) | Ebase (GPa) MD | Ebase (GPa) TD | Emag (GPa) MD | Emag (GPa) TD | Ebase/Emag (—) MD | Ebase/Emag (—) TD | SQ (—) |
|---|---|---|---|---|---|---|---|---|---|---|---|---|
| Embodiment 1 | 5.8 | 2.4 | 0.7 | 8.9 | 2.42 | 6.87 | 7.36 | 8.39 | 11.0 | 0.82 | 0.67 | 0.81 |
| 2 | 5.8 | 2.4 | 0.7 | 8.9 | 2.42 | 9.81 | 5.88 | 9.32 | 11.4 | 1.04 | 0.52 | 0.82 |
| 3 | 5.8 | 2.4 | 0.7 | 8.9 | 2.42 | 8.83 | 6.37 | 7.85 | 9.81 | 1.13 | 0.65 | 0.81 |
| 4 | 5.8 | 2.1 | 0.6 | 8.2 | 2.76 | 6.87 | 7.36 | 7.91 | 9.90 | 0.87 | 0.74 | 0.74 |
| 5 | 5.8 | 3.0 | 1.0 | 9.8 | 1.93 | 6.87 | 7.36 | 8.58 | 11.6 | 0.80 | 0.63 | 0.69 |
| 6 | 5.5 | 2.1 | 0.6 | 8.2 | 2.61 | 6.69 | 7.21 | 7.91 | 9.90 | 0.93 | 0.73 | 0.78 |
| 7 | 6.3 | 2.1 | 0.6 | 9.0 | 3.00 | 8.83 | 6.37 | 7.91 | 9.90 | 1.12 | 0.64 | 0.81 |
| 8 | 7.1 | 2.1 | 0.6 | 9.8 | 3.38 | 9.49 | 5.90 | 7.91 | 9.90 | 1.20 | 0.60 | 0.82 |
| 9 | 4.2 | 2.4 | 0.5 | 7.1 | 1.75 | 6.87 | 7.36 | 7.88 | 9.76 | 0.87 | 0.75 | 0.75 |
| 10 | 5.8 | 0.3/2.2 | 0.7 | 9.0 | 2.32 | 9.26 | 5.88 | 7.85 | 9.81 | 1.18 | 0.60 | 0.84 |
| 11 | 5.8 | 0.2/1.9 | 0.6 | 8.5 | 2.76 | 9.49 | 5.90 | 8.39 | 10.8 | 1.13 | 0.55 | 0.83 |
| 12 | 5.0 | 0.3/2.4 | 0.5 | 8.2 | 1.85 | 6.32 | 6.67 | 7.72 | 8.42 | 0.82 | 0.79 | 0.68 |
| Comparison ex. 1 | — | — | — | 13.0 | — | 7.85 | — | 13.7 | — | 0.69 | — | 0.84 |
| 2 | 5.8 | 2.4 | 0.7 | 8.9 | 2.42 | 7.94 | 4.12 | 14.6 | 5.16 | 0.54 | 0.81 | 0.89 |
| 3 | 5.8 | 2.4 | 0.7 | 8.9 | 2.42 | 9.81 | 5.88 | 6.67 | 6.28 | 1.47 | 0.94 | 0.55 |
| 4 | 5.8 | 2.4 | 0.7 | 8.9 | 2.42 | 5.88 | 8.83 | 8.34 | 10.0 | 0.71 | 0.88 | 0.83 |
| 5 | 5.8 | 2.4 | 0.7 | 8.9 | 2.42 | 5.88 | 11.8 | 7.85 | 10.3 | 0.75 | 1.14 | 0.81 |
| 6 | 5.8 | 2.4 | 0.7 | 8.9 | 2.42 | 9.81 | 5.88 | 8.63 | 10.8 | 1.14 | 0.55 | 0.81 |
| 7 | 5.8 | 2.4 | 0.7 | 8.9 | 2.42 | 6.87 | 7.36 | 7.85 | 10.3 | 0.88 | 0.71 | 0.85 |
| 8 | 5.8 | 2.4 | 0.7 | 8.9 | 2.42 | 9.32 | 5.88 | 7.85 | 9.90 | 1.19 | 0.59 | 0.80 |
| 9 | 7.0 | 1.4 | 0.5 | 9.0 | 5.0 | 9.49 | 5.90 | 7.24 | 8.38 | 1.31 | 0.70 | 0.83 |
| 10 | 5.0 | 3.1 | 1.0 | 9.1 | 1.61 | 6.32 | 6.67 | 8.49 | 10.8 | 0.74 | 0.62 | 0.80 |
| 11 | 7.1 | 0.2/1.5 | 0.5 | 9.3 | 4.18 | 9.49 | 5.90 | 7.78 | 9.76 | 1.22 | 0.60 | 0.82 |
| 12 | 5.0 | 0.3/2.7 | 0.9 | 8.9 | 1.67 | 6.32 | 6.67 | 8.58 | 11.5 | 0.74 | 0.58 | 0.69 |
| 13 | 5.8 | 0.2/1.9 | 0.6 | 8.5 | 2.76 | 5.88 | 8.83 | 8.08 | 10.3 | 0.73 | 0.86 | 0.81 |
| 14 | 5.8 | 0.2/1.9 | 0.6 | 8.5 | 2.76 | 9.81 | 5.88 | 7.24 | 8.38 | 1.35 | 0.70 | 0.77 |
| 15 | 5.8 | 0.3/2.2 | 0.7 | 9.0 | 2.32 | 6.87 | 7.36 | 8.20 | 10.7 | 0.84 | 0.69 | 0.82 |

TABLE 2

| | RF output (dB) 130 KHz | RF output (dB) 1.2 MHz | RF output (dB) 4.7 MHz | Environmental stability (%) | ×10⁻⁴ B.E.R. before | ×10⁻⁴ B.E.R. after | D.O (15 μs, −6 dB) (counts/min.) before | D.O (15 μs, −6 dB) (counts/min.) after |
|---|---|---|---|---|---|---|---|---|
| Embodiment 1 | −0.5 | −0.4 | +0.3 | +0 | 2 | 2.5 | 2.4 | 3.0 |
| 2 | −0.7 | −0.5 | +0.1 | −0.1 | 3 | 2.2 | 2.6 | 2.7 |
| 3 | −0.3 | −0.3 | +0.4 | −0.1 | 5 | 3 | 3.2 | 3.0 |
| 4 | −0.8 | −0.6 | +0.1 | −0.2 | 4.8 | 4.9 | 3.8 | 4.0 |
| 5 | −0.9 | −0.7 | +0.3 | ±0 | 3.8 | 3.9 | 1.9 | 2.0 |
| 6 | −0.6 | −0.4 | +0.1 | ±0 | 3.4 | 3.5 | 2.2 | 2.2 |
| 7 | −0.1 | −0.2 | +0.2 | +0.1 | 1.2 | 1.4 | 1.4 | 1.2 |
| 8 | −0.2 | −0.1 | +0.1 | ±0 | 1.0 | 1.1 | 1.6 | 1.7 |
| 9 | −0.3 | −0.1 | ±0 | −0.1 | 2.2 | 1.9 | 2.0 | 1.6 |
| 10 | +0.4 | +0.2 | +0.8 | −0.1 | 0.9 | 1.1 | 0.8 | 1.1 |
| 11 | +0.2 | ±0 | +0.6 | −0.1 | 1.2 | 1.4 | 1.2 | 1.3 |
| 12 | +0.3 | +0.1 | +0.6 | +0.1 | 2.2 | 1.9 | 3.0 | 2.6 |
| Comparison ex. 1 | ±0 | ±0 | ±0 | −12.0 | 1.0 | 3.0 | 2.2 | 10.0 |
| 2 | +1.2 | +1.1 | +1.0 | −7.0 | 0.4 | 5.2 | 1.1 | 3.2 |
| 3 | −6.8 | −4.1 | −1.2 | −0.2 | 8 | 4 | 7.2 | 9.0 |
| 4 | −0.5 | −0.3 | +0.2 | ±0 | 2 | 1.4 | 2.8 | 7.4 |
| 5 | −0.8 | −0.6 | +0.3 | +0.1 | 3.1 | 2.5 | 1.8 | 5.4 |
| 6 | −1.8 | −1.1 | −0.8 | −0.9 | 5 | 3 | 4.2 | 5.6 |
| 7 | −0.3 | −0.2 | −0.5 | ±0 | 8 | 6 | 2.8 | 4.2 |
| 8 | −3.0 | −3.3 | −4.1 | −0.1 | 30 | X | 17.5 | X |
| 9 | −1.1 | −1.5 | +0.1 | ±0 | 6.9 | X | 4.1 | X |
| 10 | −0.1 | −0.2 | −0.1 | −0.2 | 1.2 | 3.8 | 3.4 | 9.2 |
| 11 | +0.2 | +0.1 | +0.1 | −0.1 | 0.8 | 6.5 | 1.0 | 10.1 |
| 12 | −0.2 | −0.3 | −0.2 | ±0 | 2.6 | X | 1.2 | 26.0 |
| 13 | +0.2 | +0.1 | +0.2 | −0.1 | 1.0 | X | 2.6 | X |
| 14 | −0.1 | −0.1 | +0.1 | −0.8 | 2 | 30 | 3.6 | 4.2 |
| 15 | −2.5 | −3.4 | −4.5 | −0.2 | 600 | X | 4.4 | X |

TABLE 3

|  | Tbase (μm) | Tmag (μm) | Tback (μm) | Ttotal (μm) | Tbase/Tmag (—) | Ebase (GPa) MD | Ebase (GPa) TD | Emag (GPa) MD | Emag (GPa) TD | Ebase/Emag (—) MD | Ebase/Emag (—) TD | output change | increase rate B.E.R. (times) |
|---|---|---|---|---|---|---|---|---|---|---|---|---|---|
| Embodiment 13 | 4.2 | 2.0 | 0.6 | 6.8 | 2.1 | 12.7 | 12.7 | 8.39 | 11.0 | 1.6 | 1.3 | O | 2.3 |
| 14 | 4.2 | 2.0 | 0.6 | 6.8 | 2.1 | 19.6 | 9.81 | 8.39 | 11.0 | 2.5 | 1.0 | O | 1.9 |
| 15 | 4.2 | 0.2/1.7 | 0.6 | 6.7 | 2.2 | 12.7 | 12.7 | 7.85 | 9.81 | 1.62 | 1.29 | O | 2.9 |
| 16 | 4.2 | 0.2/1.8 | 0.6 | 6.8 | 2.1 | 17.7 | 8.39 | 8.28 | 10.3 | 2.14 | 0.81 | O | 1.7 |
| 17 | 3.8 | 1.8 | 0.4 | 6.0 | 2.1 | 12.7 | 12.7 | 7.91 | 9.90 | 1.61 | 1.28 | O | 2.0 |
| 18 | 2.8 | 1.3 | 0.3 | 4.4 | 2.15 | 17.7 | 8.39 | 7.72 | 8.42 | 2.29 | 0.996 | O | 1.1 |
| 19 | 4.4 | 1.3 | 0.4 | 6.1 | 3.38 | 12.7 | 12.7 | 7.88 | 9.76 | 1.61 | 1.30 | O | 1.2 |
| Comparison ex. 16 | 4.2 | 2.0 | 0.6 | 6.8 | 2.1 | 9.81 | 19.6 | 8.39 | 11.0 | 1.25 | 2.0 | X | 10.8 |
| 17 | 3.8 | 0.2/1.8 | 0.6 | 6.4 | 1.9 | 4.51 | 18.6 | 8.30 | 10.8 | 0.54 | 1.72 | X | 8.3 |
| 18 | 4.2 | 2.3 | 0.4 | 6.9 | 1.83 | 12.7 | 12.7 | 6.67 | 6.28 | 1.90 | 2.02 | X | 2.4 |
| 19 | 4.2 | 0.2/1.7 | 0.6 | 6.7 | 2.2 | 17.7 | 8.39 | 7.71 | 7.33 | 2.30 | 1.15 | O | 24.1 |
| 20 | 2.8 | 1.3 | 0.3 | 4.4 | 2.15 | 12.7 | 12.7 | 14.6 | 5.16 | 0.87 | 2.46 | X | 2.2 |

What is claimed is:

1. A tape-shaped magnetic medium comprising, a nonmagnetic base film having at least one magnetic layer including ferromagnetic powder particles on a side of said nonmagnetic base film, each of said ferromagnetic powder particles in said magnetic layer being a plate-like ferromagnetic hexagonal ferrite particle having an axis of easy magnetization perpendicular to the plane of said particle, each of said ferromagnetic powder particles in said magnetic layer being a plate-like ferromagnetic hexagonal ferrite particle having a crystal structure that includes magnetoplumbite and spinel crystal structures at the same time, the magnetization of said ferromagnetic powder particles being aligned in the longitudinal direction of said tape-shaped magnetic medium, said nonmagnetic base film being a polyethylenenaphthalate film, the ratio of the thicknesses of said polyethylenenaphthalate film and said magnetic layer being between 1.7 and 4.0, and the ratios of the Young's module of said polyethylenenaphthalate film and said magnetic layer being between 0.8 and 1.2 in the longitudinal direction, and between 0.5 and 0.8 in the transverse direction.

2. A tape-shaped magnetic medium according to claim 1, wherein each of said ferromagnetic powder particles in said magnetic layer being a plate-like ferromagnetic hexagonal ferrite particle is a compound particle composed of barium, iron, nickel, titanium, and lead.

3. A tape-shaped magnetic medium according to claim 1, wherein the total thickness of said tape-shaped magnetic medium is more than 4 μm but less than 7 μm.

4. A tape-shaped magnetic medium comprising, a nonmagnetic base film having at least one magnetic layer including ferromagnetic powder particles on a side of said nonmagnetic base film, each of said ferromagnetic powder particles in said magnetic layer being a plate-like ferromagnetic hexagonal ferrite particle having an axis of each magnetization perpendicular to the plane of said particle, each of said ferromagnetic powder particles in said magnetic layer being a plate-like ferromagnetic hexagonal ferrite particle having a crystal structure that includes magnetoplumbite and spinel crystal structures at the same time, the magnetization of said ferromagnetic powder particles being aligned in the longitudinal direction of said tape-shaped magnetic medium, said nonmagnetic base film being a aromatic polyamide film, the ratio of the thicknesses of said aromatic polyamide film and said magnetic layer being between 2.0 and 3.5, and the ratios of the Young's module of said aromatic polyamide film and said magnetic layer being between 1.0 and 3.0 in the longitudinal direction, and between 0.5 and 1.5 in the transverse direction.

5. A tape-shaped magnetic medium according to claim 4, wherein each of said ferromagnetic powder particles in said magnetic layer being a plate-like ferromagnetic hexagonal ferrite particle is a compound particle composed of barium, iron, nickel, titanium, and lead.

6. A tape-shaped magnetic medium according to claim 4, wherein the total thickness of said tape-shaped magnetic medium is more than 4 μm but less than 7 μm.

* * * * *